US009705154B2

(12) United States Patent
Lee et al.

(10) Patent No.: US 9,705,154 B2
(45) Date of Patent: Jul. 11, 2017

(54) METHOD FOR PRELITHIATION, METHOD FOR FABRICATING LITHIUM SECONDARY BATTERY COMPRISING THE METHOD, AND LITHIUM SECONDARY BATTERY FABRICATED FROM THE FABRICATING METHOD (71) Applicant: LG Chem, Ltd., Seoul (KR)

(72) Inventors: Sang-Kyun Lee, Daejeon (KR); Bok-Kyu Choi, Daejeon (KR); Byoung-Bae Lee, Daejeon (KR); Bong-Hyun Jeong, Daejeon (KR); Kyoung-Ho Kim, Daejeon (KR); Jang-Bae Kim, Daejeon (KR)

(73) Assignee: LG Chem, Ltd. (KR)

( * ) Notice: Subject to any disclaimer, the term of this patent is extended or adjusted under 35 U.S.C. 154(b) by 118 days.

(21) Appl. No.: 14/504,529

(22) Filed: Oct. 2, 2014

(65) Prior Publication Data
US 2015/0017543 A1 Jan. 15, 2015

Related U.S. Application Data (63) Continuation of application No. PCT/KR2014/002012, filed on Mar. 11, 2014.

(30) Foreign Application Priority Data

Mar. 11, 2013 (KR) .................. 10-2013-0025688
Mar. 11, 2014 (KR) .................. 10-2014-0028192

(51) Int. Cl.
*H01M 10/052* (2010.01)
*H01M 10/058* (2010.01)
(Continued)

(52) U.S. Cl.
CPC ....... *H01M 10/052* (2013.01); *H01M 10/058* (2013.01); *H01M 10/4242* (2013.01); *H01M 10/446* (2013.01); *Y10T 29/49108* (2015.01)

(58) Field of Classification Search
CPC ... H01M 4/0416; H01M 4/0459; H01M 4/382
See application file for complete search history.

(56) References Cited

U.S. PATENT DOCUMENTS 6,461,769 B1    10/2002  Ando et al.
2010/0142121 A1  6/2010  Fujii et al.
(Continued)

FOREIGN PATENT DOCUMENTS

CN    102842703 A   12/2012
JP    2007299698 A  11/2007
(Continued)

OTHER PUBLICATIONS

International Search Report from PCT/KR2014/002012 dated Jul. 10, 2014.

*Primary Examiner* — Nicholas P D'Aniello
(74) *Attorney, Agent, or Firm* — Lerner, David, Littenberg, Krumholz & Mentlik, LLP (57) ABSTRACT The present disclosure relates to a method for prelithiation, and in particular, to a method for prelithiation that predopes lithium into at least one unit cell uniformly in large amounts. According to an aspect of the present disclosure, there is provided a method for prelithiation including an preparing at least one unit cell, the unit cell comprising a cathode, an anode, and a separator interposed between the cathode and the anode, disposing the prepared at least one unit cell in a reaction tank, and connecting electrodes having the same polarity, adding an electrolyte solution into the reaction tank,
(Continued)

disposing a lithium metal plate in the electrolyte solution, and connecting the lithium metal plate to the anode, and doping the anode.

19 Claims, 6 Drawing Sheets

(51) Int. Cl.
*H01M 10/42* (2006.01)
*H01M 10/44* (2006.01)

(56) References Cited

U.S. PATENT DOCUMENTS

| | | |
|---|---|---|
| 2011/0278161 A1 | 11/2011 | Choi et al. |
| 2012/0018309 A1 | 1/2012 | Min et al. |
| 2012/0042490 A1 | 2/2012 | Lee et al. |
| 2012/0050950 A1 | 3/2012 | Kim et al. |

FOREIGN PATENT DOCUMENTS

| | | |
|---|---|---|
| JP | 2011243941 A | 12/2011 |
| KR | 2000-0070528 A | 11/2000 |
| KR | 2010-0065112 A | 6/2010 |
| KR | 2012-0017600 A | 2/2012 |
| KR | 10-1128585 B1 | 3/2012 |
| KR | 2012-0020895 A | 3/2012 |
| KR | 10-1179629 B1 | 9/2012 |

METHOD FOR PRELITHIATION, METHOD FOR FABRICATING LITHIUM SECONDARY BATTERY COMPRISING THE METHOD, AND LITHIUM SECONDARY BATTERY FABRICATED FROM THE FABRICATING METHOD

CROSS-REFERENCE TO RELATED APPLICATION

The present application is a continuation of International Application No. PCT/KR2014/002012 filed on Mar. 11, 2014, which claims priority to Korean Patent Application No. 10-2013-0025688 filed in the Republic of Korea on Mar. 11, 2013 and Korean Patent Application No. 10-2014-0028192 filed in the Republic of Korea on Mar. 11, 2014, the disclosure of which is incorporated herein by reference.

TECHNICAL FIELD

The present disclosure relates to a method for prelithiation, and more particularly, to a method for prelithiation that predopes lithium into at least one unit cell uniformly in large amounts, a method for fabricating a lithium secondary battery comprising the method, and a lithium secondary battery fabricated from the fabricating method.

BACKGROUND ART

Recently, there has been growing interest in energy storage technologies. As the application fields of energy storage technologies have been extended to mobile phones, camcorders, lap-top computers and even electric cars, efforts have increasingly been made towards the research and development of electrochemical devices. In this aspect, electrochemical devices have attracted the most attention. The development of rechargeable secondary batteries has been the focus of particular interest.

Among currently available secondary batteries, lithium secondary batteries developed in the early 1990's have received a great deal of attention due to their advantages of higher operating voltages and higher energy densities than traditional batteries such as Ni-MH batteries and the like.

Generally, a lithium secondary battery is fabricated by making a cathode and an anode using a material capable of intercalating/deintercalating or alloying/dealloying lithium ions, and filling an organic electrolyte solution or a polymer electrolyte solution in between the cathode and the anode, and produces electrical energy by an oxidation/reduction reaction when the lithium ions intercalate and deintercalate on the cathode and the anode.

Currently, as an electrode active material (anode active material) for an anode of a lithium secondary battery, a carbon-based material is primarily being used. Among the carbon-based material, graphite has a theoretical capacity of about 372 mAh/g, and an actual realizable capacity of currently available graphite is from about 350 to about 360 mAh/g. However, a carbon-based material such as graphite is insufficient for a high capacity lithium secondary battery. To meet the demand, another anode active material is a metal such as silicon (Si) and tin (Sn) that exhibits a higher charge/discharge capacity than a carbon-based material and may be electrochemically alloyed with lithium and its oxide or alloy. However, a metal-based (non-carbon-based) anode active material experiences cracking and pulverization due to a large volume change involved in lithium charging/discharging, and as a consequence, a secondary battery using a metal-based anode active material has drawbacks of a drastic capacity drop and a short cycle life during charging/discharging cycles.

Meanwhile, due to its high capacity property, a cathode active material using nickel, manganese, or cobalt, particularly, a manganese-rich NMC-based or MNC-based cathode active material gain a great attention, but such a cathode active material has an excessive amount of $Mn^{3+}$ ions present on the surface, and $Mn^{3+}$ goes through a disproportionation reaction ($2Mn^{3+} \rightarrow Mn^{4+}+Mn^{2+}$). $Mn^{2+}$ ions generated during the disproportionation reaction are released into an electrolyte solution, resulting in a significant degradation in cycle and storage characteristics of the battery. To solve this, attempts have been made to diffuse lithium through a direct contact between a perforated current collector (for example, a foil) and a lithium metal (in the shape of a plate or foil), or to predope a lithium metal through a short circuit between electrode active materials.

However, when a perforated current collector is used, there are problems with a reduced loading amount of electrode active materials and consequently a reduced capacity as well as a reduced contact area of an electrode active material with a current collector decreases and consequently an increased resistance to an electric current. Also, in the case of a certain cathode active material for high capacity, the problem with collapse of a crystal structure based on a voltage range occurs, and resulting metal ions are well known to deteriorate a solid electrolyte interphase (SEI) layer created on the anode surface.

Accordingly, there is still the demand for a new prelithiation method to prevent reduction in capacity and cycle life of a battery as well as an irreversible capacity reduction occurring when a metal-based anode active material is used.

DISCLOSURE

Technical Problem

The present disclosure is designed to solve the above problem, and therefore, the present disclosure is directed to providing a method that uniformly predopes lithium into an entire anode within a large amount of high capacity batteries (unit cells) and significantly prevents penetration of metal ions from a cathode onto an anode surface.

Technical Solution

To achieve the above object, according to an aspect of the present disclosure, there is provided a method for prelithiation including preparing at least one unit cell, the unit cell comprising a cathode, an anode, and a separator interposed between the cathode and the anode, disposing the prepared at least one unit cell in a reaction tank, and connecting electrodes having the same polarity, adding an electrolyte solution into the reaction tank, disposing a lithium metal plate in the electrolyte solution, and connecting the lithium metal plate to the anode, and doping the anode.

These and other objects and advantages of the present disclosure will be understood by the following description. Also, it will be apparent that the objects and advantages of the present disclosure may be realized by means or methods stated in the appended claims, and combinations thereof.

Advantageous Effects

According to the present disclosure, a low initial irreversible capacity of an anode may be ensured and penetration of cathode metal ions into an SEI on the anode surface may be prevented, and as a result, a capacity and a cycle life of a battery may be greatly improved.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

DESCRIPTION OF THE PREFERRED EMBODIMENT

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The term electrode assembly used herein represents one unit cell or an assembly formed by assembling at least two unit cells with a separator interposed therebetween, and the term unit cell represents a unit including an electrode, that is, a cathode and an anode, and a separator interposed between the cathode and the anode.

Figure 1:
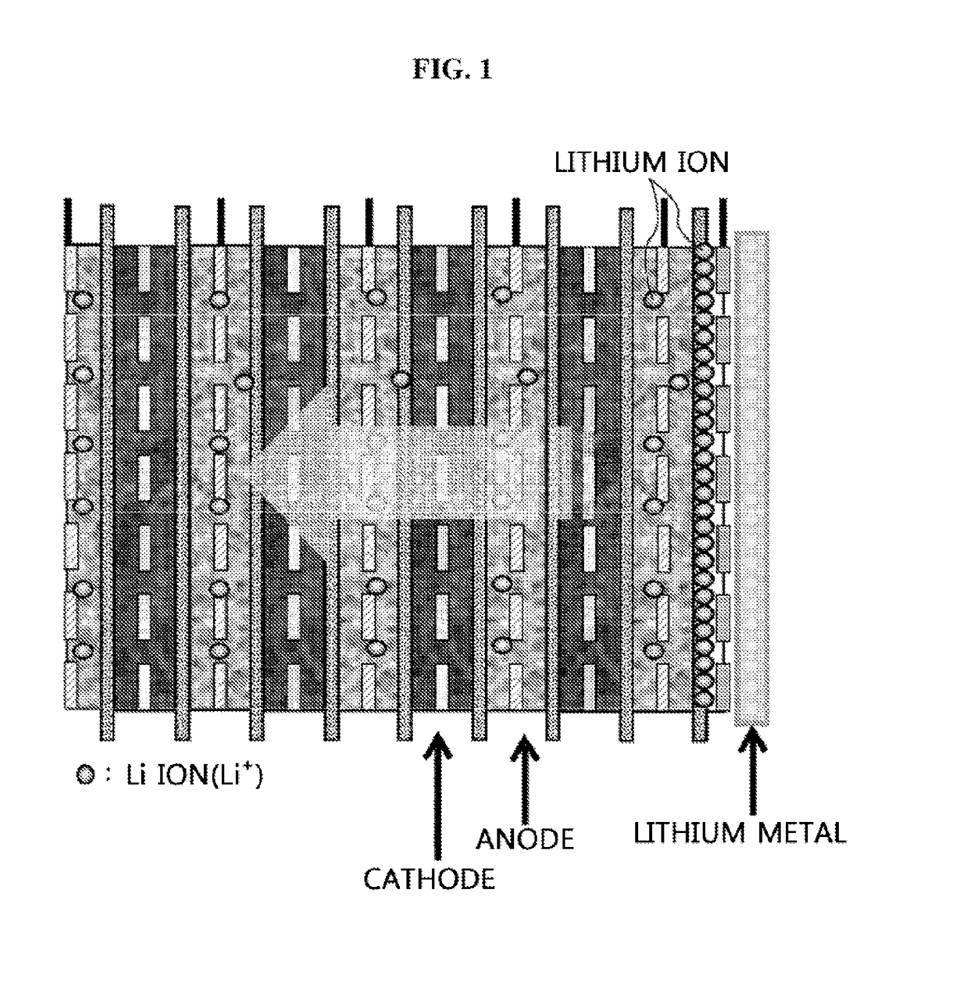
FIG. 1 is a diagram illustrating an example of a method for prelithiation according to a related art.

FIG. 1 is a diagram illustrating an example of a method for prelithiation according to a related art. This is just an example of a related art as described above in the background of the specification, and illustrates a method for lithium diffusion through a direct contact between a current collector and a lithium metal.

Referring to FIG. 1, the method of the related art performs doping, in one direction, of a lithium metal plate located on one side by diffusion of lithium generated therefrom into at least one unit cell(s) or electrode assembly(s) in which an anode, a separator, and a cathode are disposed and arranged in a sequential order. This method may cause problems with a slow doping rate and a long doping time caused by a natural diffusion rate (time), a doping extent difference or non-uniform doping due to an arrangement order (diffusion distance), and procedural inconvenience caused by separate processes of doping and battery assembly.

The prelithiation method shown in FIG. 1 represents doping by a general diffusion method. In this case, a doping level of the electrode layer in a direct contact with the Li metal allows for uniform doping, but as a distance from Li increases and a path of Li ions increases, uniform doping requires more time and uniformity becomes poorer. The inventors discovered that in case in which prelithiation is performed in this way, as a number of stacks increases, a difference in irreversible level between electrodes increases, and afterward, completed the present invention.

A method for prelithiation according to an aspect of the present disclosure includes (S1) preparing at least one unit cell, (S2) connecting the unit cell, (S3) adding an electrolyte solution, (S4) connecting a lithium metal plate to an anode, and (S5) doping the anode.

In S1, basically, a cathode, an anode, and a separator interposed between the cathode and the anode are prepared as a unit cell.

Figure 2:
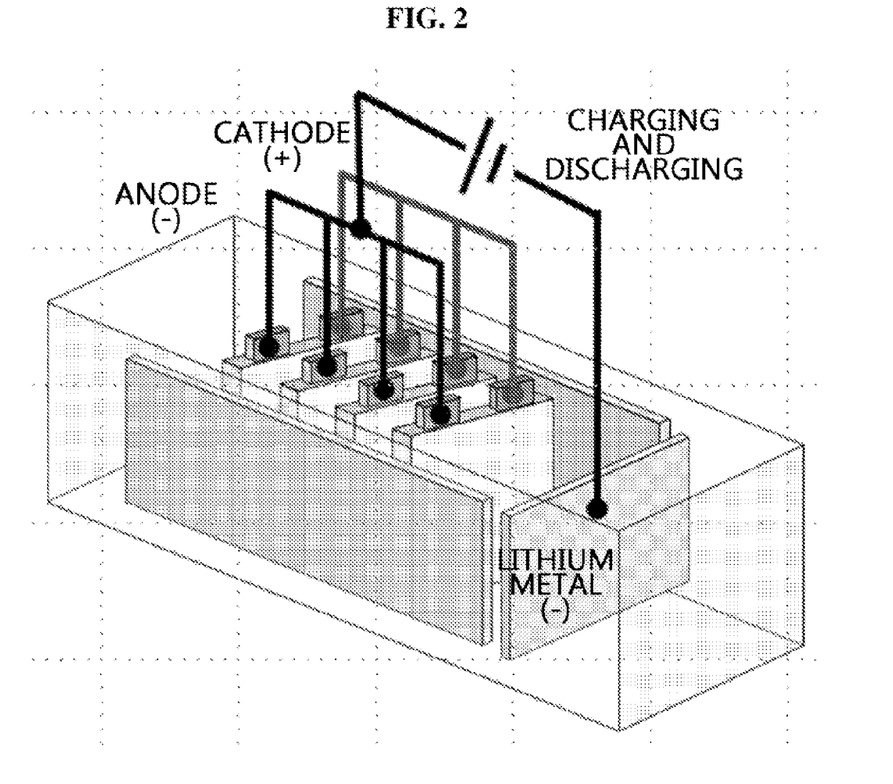
FIG. 2 is a schematic diagram illustrating a method for prelithiation according to an exemplary embodiment of the present disclosure.

FIG. 2 is a schematic diagram illustrating a method for prelithiation according to an exemplary embodiment of the present disclosure, and the present disclosure is not limited thereto. In this method, a number of unit cells prepared, each including an anode, a separator, and a cathode, is basically at least one, preferably, plural. Accordingly, arrangement of the plurality of unit cells allows for doping of a large number of unit cells in a concurrent or batch mode based on its arrangement.

Alternatively, in the unit cell, a cathode lead and an anode lead connected to the cathode and the anode independently through a cathode tab and an anode tab, respectively, may be prepared. In the case of, for example, a stack battery, a stack & folding battery, and a jelly-roll battery, a tab may be connected to outside for each electrode each folding or rolling one or more times, and a plurality of tabs converge on one or more leads, preferably, one lead.

When prelithiation is performed using a lead as described in the foregoing, in the case of a stack cell structure, concurrent prelithiation of a stack cell may be attempted, rather than prelithiation of an individual electrode.

Also, the unit cell may have at least one unit cell structure in which a separator is interposed between electrodes of opposite polarity, with two outermost electrodes having opposite polarity, or at least one unit cell structure in which a separator is interposed between electrodes of opposite polarity, with two outermost electrodes having the same polarity.

The electrode according to one embodiment of the present disclosure is not specially limited, but may be manufactured by binding an electrode active material (generally, in particulate form) to a current collector by a common method known in the art.

Of the electrode active material, a cathode active material may include, as a non-limiting example, a common cathode active material used for a cathode of a conventional electrochemical device, in particular, lithium manganese oxide, lithium cobalt oxide, lithium nickel oxide, lithium iron oxide, or lithium composite oxides thereof. Preferably, the cathode active material may include lithium-containing transition metal oxide, for example, any one selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0\le y<1)$, $Li_xNi_{1-y}Mn_yO_2(0.5<x<1.3, 0\le y<1)$, $Li_x(Ni_aCo_bMn_c)O_4(0.5<x<1.3, 0<a<2, 0<b<2, 0<c<2, a+b+$ c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3), and $Li_xFePO_4$ (0.5<x<1.3), or mixtures thereof, and the lithium-containing transition metal oxide may be coated with a metal such as aluminum (Al) or metal oxide. Also, besides the lithium-containing transition metal oxide, sulfide, selenide, and halide may be used.

An anode active material may include, as a non-limiting example, a common anode active material used for an anode of a conventional electrochemical device, in particular, for example, carbon such as petroleum coke, activated carbon, graphite, non-graphitizable carbon, and graphite-based carbon; $Li_xFe_2O_3$(0≤x≤1), $Li_xWO_2$(0≤x≤1), $Sn_xMe_{1-x}Me'_yO_z$ (Me: Mn, Fe, Pb, Ge; Me': Al, B, P, Si, elements of Groups 1, 2, and 3 in the periodic table, and halogen; metal composite oxide (0<x≤1; 1≤y≤3; 1≤x≤8); lithium metals; lithium alloys; silicon-based alloys; tin-based alloys; oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials, preferably, non-carbon-based materials such as Si and Sn.

The separator generally has a form of porous membrane having a plurality of pores. The porous separator is not specially limited, and may be manufactured in a form of a film or a non-woven or woven fabric by a common method known in the art. The separator may be, as a non-limiting example, in a form of a film or a non-woven or woven fabric formed from any one polymer selected from the group consisting of polyethylene, polypropylene, polyethyleneterephthalate, polybutyleneterephthalate, polyester, polyacetal, polyamide, polycarbonate, polyimide, polyetheretherketone, polyaryletherketone, polyetherimide, polyamideimide, polybenzimidazole, polyethersulfone, polyphenyleneoxide, cyclic olefin copolymer, polyphenylenesulfide, and polyethylenenaphthalene, or mixtures thereof.

Also, the porous separator may further include a porous coating layer containing inorganic particles and a binder, as known in the art. The inorganic particles are selected from the group consisting of inorganic particles having a dielectric constant greater than or equal to about 5, inorganic particles having a lithium ion delivery capability, and mixtures thereof. The binder includes, but is not limited to, any one selected from the group consisting of polyvinylidene fluoride (PVDF), polyacrylic acid (PAA), polyethylene glycol (PEG), polypropylene glycol (PPG), toluene diisocyanate (TDI), polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, polyacrylonitrile, and styrene butadiene rubber (SBR), or mixtures thereof.

In S2, the at least one unit cell prepared in Si is disposed in a reaction tank.

The reaction tank is not specially limited if it has a structure capable of supporting the at least one unit cell described in the foregoing and a lithium metal plate to be subsequently added and holding an electrolyte solution to be subsequently added. The reaction tank serves as a medium for transferring lithium to be used for doping. That is, the reaction tank may be a medium for holding a lithium metal plate as a lithium source and optionally a fluid such as an electrolyte solution and the like, and moving and transferring lithium to dope lithium into the electrode in the unit cell, particularly, the electrode active material.

Optionally, the reaction tank may include at least one support partition wall inside thereof for the procedural convenience. Basically, the support partition wall supports a unit cell or a lithium metal plate, and during a doping (prelithiation) process, the support partition wall may function as a side support when the unit cell (or the lithium metal plate) is inserted or deserted (in the case of a metal plate, for example, a lithium metal plate remaining even after doping may be eliminated or moved). The support partition wall may be configured such that when lithium from a lithium source, for example, an electrolyte solution or a lithium metal plate within one section is insufficient during doping, lithium from a lithium source within other section may be supplied to cover the lithium shortage.

Also, the support partition wall may have an electrochemically isolating function. This may isolate sections within the reaction tank so that the sections may be perfectly distinguished from each other. Particularly, as the support partition wall electrochemically isolates the sections from each other, each support partition wall may function as an individual reaction tank.

Subsequently, a connection of the at least one unit cell disposed in the reaction tank is made such that electrodes having the same polarity are connected. The cathode is connected to at least one cathode of at least one other unit cell, and in the same manner, the anode is connected to at least one anode of at least one other unit cell.

As described in the foregoing, when a tab and a lead are constructed within the cell, a connection of each unit cell may be easily made by connecting leads of each unit cell based on placement of the unit cell in the reaction tank where the unit cell is subsequently disposed, temporally, that is, for doping. Also, the lead is constructed by combining the tabs within the unit cell together to complete a final battery, and is a structure commonly mounted in the art for an electrical connection within the unit cell. Accordingly, as described in the foregoing, using a structure such as the tab and the lead commonly mounted in the final battery in the art, any structural change in the unit cell for doping is not made, so battery prelithiation may be carried out in large amounts in a simple and convenient manner without bearing an additional process cost.

The connection of the same electrode may be generally established by a conducting line, a wire, or a cable. Also, as described in the foregoing, when a tab and a lead are constructed within the cell, leads of each electrode may be connected for electrodes of the same polarity. As the conducting line, the wire, or the cable, those generally used in the art may be used.

In S3, an electrolyte solution is added into the reaction tank prepared in S2. Thus, the unit cell previously disposed in the reaction tank is impregnated with the electrolyte solution. The impregnation with the electrolyte solution gets to the electrode in the unit cell, particularly, the electrode active material.

The electrolyte solution that may be used in the present disclosure includes a salt, for example, of $A^+B^-$ structure. Here, $A^+$ includes an alkali metal cation such as $Li^+$, $Na^+$ and $K^+$, or combinations thereof, preferably, $Li^+$ ions. $B^-$ includes an anion such as including $F^-$, $Cl^-$, $Br^-$, $I^-$, $NO_3^-$, $BF_4^-$, $PF_6^-$, $N(CN)_2^-$, $SCN^-$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5$ $PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3$ $(CF_2)_7SO_3^-$, $CF_3CO_2^-$, and $CH_3CO_2^-$, or combinations thereof. Preferably, the salt of the $A^+B^-$ structure is a lithium salt.

The salt of the $A^+B^-$ structure is dissolved or dissociated in an organic solvent. The organic solvent includes, as a non-limiting example, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone (γ-butyrolactone), or mixtures thereof.

In S4, a lithium metal plate is disposed in the electrolyte solution added in S3 contained in the reaction tank prepared in S2. The lithium metal plate is a source of lithium to be used for doping. The lithium metal plate having a proper thickness is cut into a proper size to meet an amount of lithium required for a doping level in a final battery, and then is disposed in place. In this case, preferably, the lithium metal plate is properly arranged with the closest unit cells in consideration of minimum process and cost for an optimum connection of the unit cell. Also, in the case where there is a support partition wall, the lithium metal plate is cut and disposed in consideration of its electrochemical isolation while taking the procedural convenience into account.

Subsequently, the lithium metal plate is connected to the anode. The connection may be established using a conducting line, a wire, or a cable, as described above regarding the connection between electrodes of the same polarity.

Finally, in S5, the anode connected to the lithium metal plate in S4 is doped.

The doping step may include electrically connecting the lithium metal plate to the anode by means of the conducting line, wire, or cable. Also, the doping of the anode is preferably performed to dope, into the anode, an amount of lithium exceeding an initial irreversible capacity of the anode. Also, the doping step may include polarizing the anode. The doping step may be promoted by charging with such applied voltage that a voltage level of the anode is defined less than or equal to 0.05V. Preferably, the doping step may be promoted by applying voltage from about 3.2 to about 4.6V.

Alternatively, the doping of the anode may be promoted to a predetermined level by heating the reaction tank containing the anode, the electrolyte solution, and the lithium metal plate to a predetermined temperature range. The heating temperature may be from about 25 to about 100° C., preferably, from about 35 to about 60° C.

According to another aspect of the present disclosure, there is provided a method for fabricating a lithium secondary battery including the above method for prelithiation. Also, there is provided a lithium secondary battery fabricated by the above method for fabricating a lithium secondary battery.

The electrode used in the present disclosure may be manufactured by a manufacturing method commonly used in the art. For example, the electrode may be manufactured by mixing an electrode active material with a binder, a solvent, if necessary, a conductive material and a dispersant and agitating the mixture to prepare a slurry, coating the slurry on a current collector, and compressing the result.

The binder may include polyvinylidene fluoride, polyvinylalcohol, carboxyl methyl cellulose (CMC), starch, hydroxypropyl cellulose, regeneration unit cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like.

The solvent may be, as a non-limiting example, acetone, tetrahydrofuran, methylene chloride, chloroform, dimethylformamide, N-methyl-2-pyrrolidone (NMP), cyclohexane, water, or mixtures thereof. These solvents provide a proper level of viscosity to form a slurry coating layer at a desired level on the surface of the current collector.

The conductive material and the dispersant are not limited to a specific type if they are known and commonly used in the art. For example, the conductive material may be additionally mixed with the cathode active material particles. The conductive material is added in an amount of, for example, 1 to 50 wt % based on the total weight of the mixture including the cathode active material. The conductive material is not limited to a specific type if it has high conductivity while not causing a chemical change in the battery, and includes, for example, graphite such as natural graphite and artificial graphite; carbon black such as carbon black, acetylene black, Ketjen black, channel black, furnace black, lamp black, and thermal black; conductive fiber such as carbon fiber and metal fiber; fluoro carbon, aluminum, and metal powder such as nickel powder; conductive whisker such as zinc oxide and potassium titanate; conductive oxide such as titanium oxide; and conductive materials such as polyphenylene derivatives.

The cathode current collector is not limited to a specific type if it is conductive while not causing a chemical change in the corresponding battery, and may be made from, as a non-limiting example, stainless steel, aluminum, nickel, titanium, baked carbon, aluminum or stainless steel treated with carbon, nickel, titanium or silver on the surface thereof, or combinations thereof. Meanwhile, the anode current collector is not limited to a specific type if it is conductive while not causing a chemical change in the corresponding battery, and may be made from, as a non-limiting example, copper, gold, stainless steel, aluminum, nickel, titanium, baked carbon, copper or stainless steel treated with carbon, nickel, titanium or silver on the surface thereof, an aluminum-cadmium alloy, or combinations thereof.

The current collector may have a fine texture on the surface thereof to increase the bond strength of the cathode active material, and may be in various shapes, for example, a film, a sheet, a foil, a net, a porous product, a foam, a non-woven product, and the like.

Injection of the electrolyte solution may be performed in a proper step among a battery fabrication process based on a manufacturing process and required properties of a final product. That is, injection of the electrolyte solution may be applied before battery assembly or in a final step of battery assembly.

Hereinafter, the present disclosure will be described in detail through examples. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EMBODIMENT EXAMPLE 1

A cathode was prepared in which a three component system composed of Ni, Co, and Mn, or a cathode active material of a spinel structure such as $LiM_2O_4$(M=Mn, $Ni_{0.5}Mn_{1.5}$, CoMn), or a cathode active material of an olivine structure such as $LiMPO_4$(M=Fe, Mn, Co) was coated on an aluminum foil as a cathode current collector, an anode was prepared in which a Si-based anode active material was coated on a copper foil as an anode current collector, and at least one unit cell was prepared by roll-forming the cathode and the anode with a porous polyethylene film as a separator interposed between the cathode and the anode. The prepared unit cell was disposed in a reaction tank, and electrodes of the same polarity were connected with a cable.

An electrolyte solution including 1M $LiPF_6$ as a lithium salt and a mixture of ethylene carbonate (EC) and diethyl carbonate (DEC) at a volumeric ratio of 30:70 as an organic solvent was added into the reaction tank. A lithium metal plate was disposed in the electrolyte solution and connected to the anode, and the anode was doped, in this way, the unit cell was predoped.

A lithium secondary battery was fabricated using the predoped unit cell.

EMBODIMENT EXAMPLE 2

A lithium secondary battery was fabricated by the same method as the above embodiment example, except a cathode and an anode included leads connected thereto through tabs, and prelithiation was performed by connecting each lead.

Through this, in the case of a stack cell structure, concurrent prelithiation of a stack cell is achieved, rather than prelithiation of an individual electrode.

COMPARATIVE EXAMPLE 1

A lithium secondary battery was fabricated by the same method as Embodiment example 1 except non-prelithiation of a unit cell.

COMPARATIVE EXAMPLE 2

A lithium secondary battery predoped by the method for prelithiation according to the related art (see FIG. 1) described in the specification was fabricated.

Figure 3:
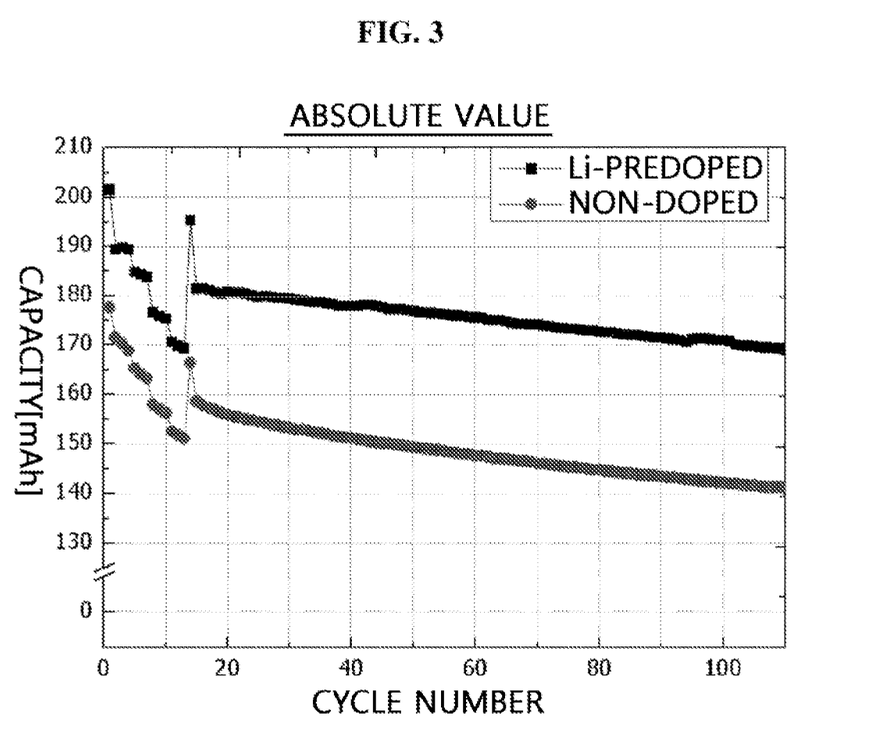
FIGS. 3 and 4 are graphs plotting an absolute capacity value (mAh) and a relative capacity value (%) based on cycle number in a battery of Embodiment example 1 and a battery of Comparative example 1, respectively.
Figure 4:
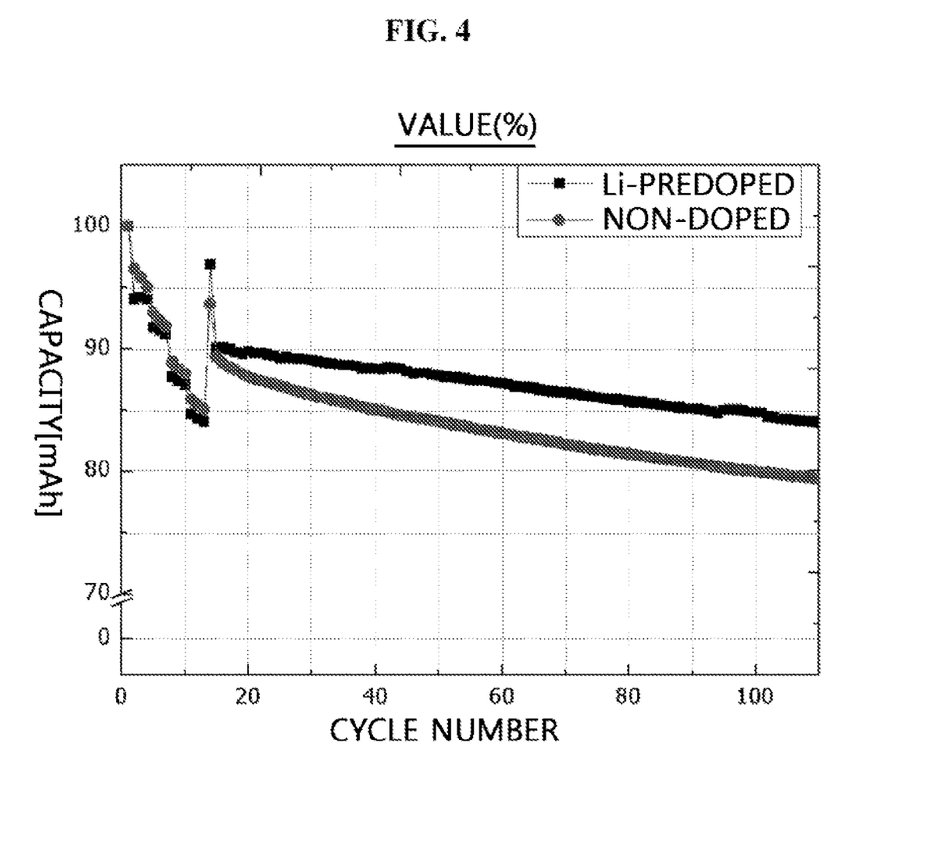

FIGS. 3 and 4 are graphs plotting an absolute capacity value (mAh) and a relative capacity value (%) based on cycle number in the battery of Embodiment example 1 and the battery of Comparative example 1, respectively. Referring to the graphs, the lithium predoped battery of Embodiment example 1 showed a high capacity and excellent cycle characteristics due to a significantly reduced initial irreversible capacity, when compared to the non-predoped battery of Comparative example 1.

The prelithiation method according to Comparative example 2 is doping by a general diffusion method, and as a distance from Li increases and a path of Li ions increases, uniform doping requires more time and uniformity becomes poorer. Also, it was found that in case in which prelithiation is performed in this way, as a number of stacks increases, a difference in irreversible level between electrodes increases.

Figure 5:
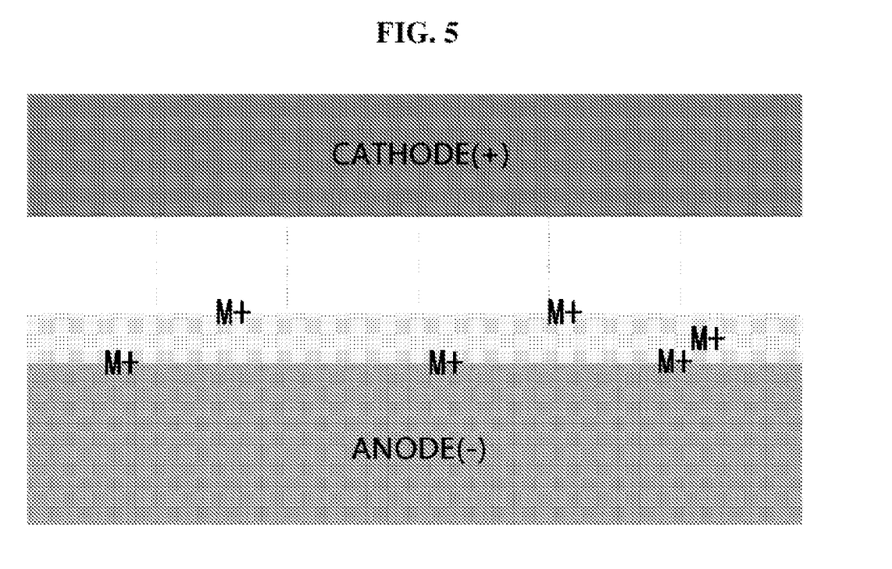
FIG. 5 is a diagram illustrating metal ions present on a cathode and an anode surface formed according to a related art.
Figure 6:
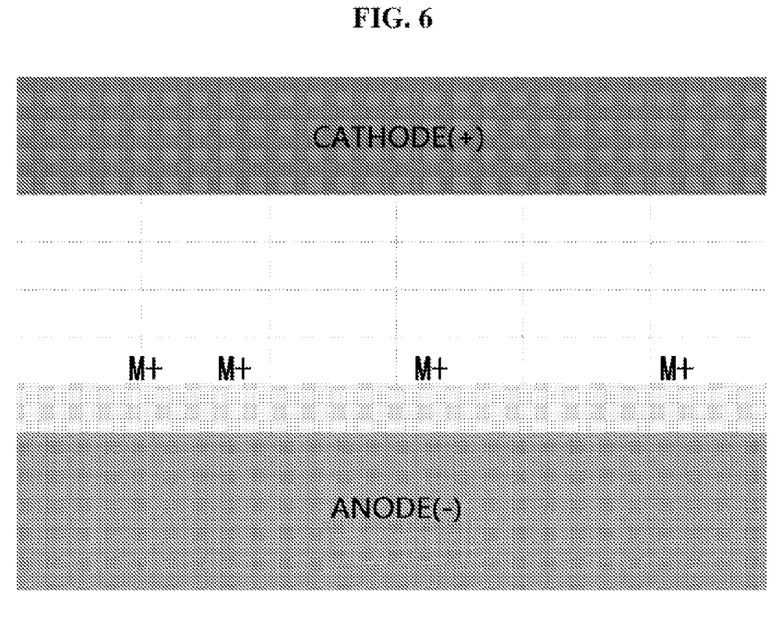
FIG. 6 is a diagram illustrating metal ions present on a cathode and an anode surface formed by a method for prelithiation according to an exemplary embodiment of the present disclosure.

For reference, FIG. 5 is a diagram illustrating metal ions present on a cathode and an anode surface formed according to a related art, and FIG. 6 is a diagram illustrating metal ions present on a cathode and an anode surface formed by a method for prelithiation lithium according to an exemplary embodiment of the present disclosure.

What is claimed is:

1. A method for prelithiation, comprising:
preparing at least one unit cell, the unit cell comprising a cathode, an anode, and a separator interposed between the cathode and the anode;
disposing the prepared at least one unit cell in a first one of a plurality of sections of a reaction tank, and connecting electrodes having the same polarity, the sections being defined within the reaction tank by at least one support partition wall positioned inside the reaction tank to separate the sections;
adding an electrolyte solution into the reaction tank;
disposing a lithium metal plate in the electrolyte solution, and forming a direct electrical connection between the lithium metal plate and the anode without forming a direct electrical connection between the lithium metal plate and the cathode, the direct electrical connection being established by a conductor selected from the group consisting of a conducting line, a wire, and a cable; and
doping the anode.

2. The method for prelithiation according to claim 1, wherein the unit cell comprises a cathode lead and an anode lead connected to the cathode and the anode independently through a cathode tab and an anode tab, respectively, and each of the cathode lead and the anode lead is connected for the electrodes having the same polarity, independently.

3. The method for prelithiation according to claim 1, wherein the unit cell has at least one unit cell structure in which a separator is interposed between electrodes of opposite polarity, with two outermost electrodes having opposite polarity, or at least one unit cell structure in which a separator is interposed between electrodes of opposite polarity, with two outermost electrodes having the same polarity.

4. The method for prelithiation according to claim 1, wherein the support partition wall electrochemically isolates the first section from a second one of the sections inside of the reaction tank.

5. The method for prelithiation according to claim 1, wherein the connection of the electrodes having the same polarity is established by a conducting line, a wire, or a cable.

6. The method for prelithiation according to claim 1, wherein the electrolyte solution includes a lithium salt.

7. The method for prelithiation according to claim 6, wherein the lithium salt includes a $Li^+$ion, and an anion including $F^-$, $Cl^-$, $Br^-$, $I^-$, $NO_3^-$, $BF_4^-$, $PF_6^-$, $N(CN)_2^-$, $SCN$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, $CH_3CO_2^-$, or combinations thereof.

8. The method for prelithiation according to claim 1, wherein the connection of the lithium metal plate to the anode is established by a conducting line, a wire, or a cable.

9. The method for prelithiation according to claim 1, where the doping of the anode is performed such that an amount of lithium exceeding an initial irreversible capacity of the anode is doped into the anode.

10. The method for prelithiation according to claim 1, wherein the doping of the anode comprises polarizing the anode.

11. The method for prelithiation according to claim 1, wherein the doping of the anode is promoted by charging with such applied voltage that a voltage level of the anode is defined less than or equal to 0.05V.

12. The method for prelithiation according to claim 1, wherein the doping of the anode is promoted by applying voltage from 3.0 to 4.6V.

13. The method for prelithiation according to claim 1, wherein the doping of the anode is promoted by heating the reaction tank.

14. The method for prelithiation according to claim 13, wherein the heating temperature of the reaction tank is from 25 to 100° C.

15. The method for prelithiation according to claim 14, wherein the heating temperature of the reaction tank is from 35 to 60° C.

16. A method for fabricating a lithium secondary battery comprising the method for prelithiation according to claim 1.

17. A lithium secondary battery fabricated by the method for fabricating a lithium secondary battery according to claim 16.

18. The method for prelithiation according to claim 1, wherein the support partition wall is configured such that lithium from a lithium source within a second one of the sections inside of the reaction tank can be supplied to the first section to cover a lithium shortage by the lithium metal plate in the first section.

19. The method for prelithiation according to claim 1, wherein the step of disposing the lithium metal plate in the electrolyte solution comprises disposing the lithium metal plate in the electrolyte solution in the first section, the method further comprising disposing a lithium source in a second one of the plurality of sections of the reaction tank, the second section being separated from the first section by the support partition wall.

* * * * *